United States Patent [19]

Wheeler et al.

[11] 3,863,070

[45] Jan. 28, 1975

[54] QUANTUM MECHANICAL MOSFET INFRARED RADIATION DETECTOR

[76] Inventors: Robert H. Wheeler, 29 Crescent Bluff Ave., Branford, Conn. 06405; Richard W. Ralston, 5002 Stears Hill Rd., Waltham, Mass. 02154

[22] Filed: May 4, 1972

[21] Appl. No.: 250,278

[52] U.S. Cl. .............. 250/339, 250/211 J, 250/370, 357/23, 357/30

[51] Int. Cl. .............. H01l 15/06

[58] Field of Search .............. 317/235 B, 235 N; 250/211 J, 339

[56] References Cited

UNITED STATES PATENTS

| | | | |
|---|---|---|---|
| 3,265,977 | 8/1966 | Wolff | 317/235 H |
| 3,571,593 | 3/1971 | Komatsubara | 250/339 |

OTHER PUBLICATIONS

Duke, Physical Review, Vol. 159, pp. 632–644, July 1967.

Stern et al., Phys. Rev. Vol. 163, No. 3, 15 Nov. 1967, pp. 816–835.

*Primary Examiner*—Rudolph V. Rolinec
*Assistant Examiner*—William D. Larkins
*Attorney, Agent, or Firm*—Bessie A. Lepper

[57] ABSTRACT

Quantum mechanical method and apparatus for detecting and modulating electromagnetic radiation in a wavelength range of from about 5 to about 50$\mu$. A potential difference (gate voltage) is impressed across a channel formed in a silicon dioxide MOS assembly. The magnitude of the gate voltage is used to adjust the energy levels of the electrons in the channel and when resonant photons are introduced into the channel there occurs photoresistance along the channel, the magnitude of which is a function of the number of resonant photons entering the channel. The photoresistive effects are the result of the interaction between the quantized electrons in the channel and photons in the radiation introduced into the channel. The device may be voltage-tunable over the wavelength range and may be used as a detector set to sense radiation of a given wavelength or as a multispectral rapid scanning device. When a gate voltage is used to maximize the photoresistive effect for radiation of a given wavelength, the radiation may be amplitude modulated by superimposing a small auxiliary ac gate voltage on the dc gate voltage to periodically reduce the photoresistive effect, thus alternately absorbing and transmitting radiation.

6 Claims, 13 Drawing Figures

QUANTUM MECHANICAL MOSFET INFRARED RADIATION DETECTOR

This invention relates to a quantum mechanical device responsive to electromagnetic radiation and more particularly to quantum mechanical voltage tunable detectors and amplitude modulators for electromagnetic radiation in a wavelength range of from 5 to about 50$\mu$.

Electromagnetic radiation in the general wavelength range of from about 5 to about 50$\mu$ may be considered to fall within the general classification of infrared radiation. The use and detection of infrared radiation has become an important tool in research and industry and this in turn has led to the development of a variety of infrared detecting and modulating devices. Infrared spectroscopy is now a standard technique in qualitative and quantitative analyses of organic compounds and in industrial product quality control. The astronomers use infrared detectors to measure temperatures of stars, and it is anticipated that infrared detectors will also find wide use in scanning agricultural crops to detect blights and in analysing atmospheres to detect pollutants. These are but a few selected examples of the ever-growing uses of infrared technology.

There are a number of different types of infrared detecting devices known and in use. These may employ thermal detecting means (bolometers), photoelectric cells, photographic emulsions or photoconductors. Many of the photoconductor devices require that they be maintained at very low or cryogenic temperature to attain a desired sensitivity. In general each of these types is best suited for detecting either the so-called near, intermediate or far infrared radiation. The infrared detectors now in use require relatively complicated optical systems which must normally include such components as prisms or gratings to disperse the radiation being detected.

In spectral analysis, as an example, it is necessary to employ gratings or prisms to separate the incoming radiation into the desired wavelength ranges and to use relatively complicated optical systems requiring a number of aligned optical elements. In the present spectrometers radiation can be scanned rapidly, but there are no detectors which are able to follow the changes in wavelength and maintain reasonable sensitivity at the same time. In any case, the scanning is all done mechanically and is thus a clumsy procedure. Finally, it is not possible with presently available spectrometers to investigate the frequency distribution of an infrared beam without dispersing it through a prism grating or interferometer.

Although there are infrared detectors which can be tuned by the addition of dispersive elements such as gratings or prisms, or by the addition of a parametric frequency converter to change the wavelength of the incoming radiation to match the detector, there are no known voltage-tunable infrared detectors which offer the possibility of constructing a relatively simple direct spectrometer without optical elements or a multispectral rapid scanning device for a number of diverse uses. The method and apparatus of this invention meet the need for a voltage-tunable infrared detector and make possible the construction of improved spectrometers and other instruments using infrared radiation. The method and apparatus of this invention also make possible the construction of an amplitude modulator for the wavelength region extending from about 5 to about 50$\mu$.

It is therefore a primary object of this invention to provide a quantum mechanical electromagnetic radiation detector which is voltage-tunable over a wavelength range from about 5 to about 50$\mu$. It is another object to provide a radiation detector of the character described which makes it possible to scan a portion of the infrared spectrum very rapidly and to investigate the frequency distribution in such a beam without the use of beam dispersing means such as a prism or dispersion grating. Yet another object is to provide an electromagnetic radiation detector which may remain sensitive over a wider temperature range than the present detectors using photoconductors. A still further object is to provide an infrared amplitude modulator for the wavelength range of between about 5 and about 50$\mu$.

It is another primary object of this invention to provide a quantum mechanical method for detecting electromagnetic radiation in the wavelength range between about 5 and about 50$\mu$ and hence an improved method for conducting spectral analysis within this range. An additional object is to provide a method of modulating the amplitude of infrared radiation in the wavelength range of about 5 to about 50$\mu$.

Other objects of the invention will in part be obvious and will in part be apparent hereinafter.

The instrument of this invention, which in one embodiment may be used as a voltage-tunable radiation detector and in another embodiment as a radiation amplitude modulator, comprises a metal oxide semiconductor having means defining a channel at the interface of a semiconducting silicon-silicon dioxide assembly, means to impress a potential difference (hereinafter referred to as a "gate voltage") across the channel, means to introduce electromagnetic radiation into the channel and means to measure the electrical resistance (hereinafter referred to as "channel resistance") along the channel. The silicon may be p-type or n-type and the channels may be characterized as inversion or accumulation layers, thus giving rise to four possible device embodiments. The embodiment in which the silicon is p-type and the channel is an inversion layer, i.e., an inverted n-type channel, is preferred and will be the exemplary embodiment described and discussed herein. The device of this invention is tunable to be responsive to different wavelengths by varying the magnitude of the gate voltage across the channel; and it can serve as an amplitude modulator by superimposing an auxiliary ac gate voltage on a tuned dc gate voltage across the channel.

The method of detecting electromagnetic radiation according to this invention comprises passing a small current along the electron channel at the interface of a semiconducting silicon with silicon dioxide, impressing a gate voltage across the channel, introducing electromagnetic radiation into the channel to cause photons to be incident on the channel, and adjusting the voltage across the channel. The magnitude of the applied gate voltage defines the quantized level separation of the electrons in the channel. Then when resonant photons are incident on the channel the channel resistance increases proportionately with the number of resonant photons. Thus changing the potential difference across the channel changes the energy levels and distribution of electrons therein and tunes the instrument to a specific narrow wavelength range; and the magnitude of increase in channel resistance is a quantitative measurement of the amount of the radiation within the predetermined wavelength range. The apparatus and method of this invention are thus based upon a newly observed phenomenon which may be termed a photoresistive effect.

The amplitude of an infrared beam, from a laser for example, is modulated according to this invention by adjusting a dc gate voltage across the channel to obtain resonance between the incoming photons and the electrons in a suitable energy level, as evidenced by increased resistance in the channel, and then superimposing a small auxiliary ac gate voltage on the dc tuning gate voltage. The result is the cycling of the system between a tuned state and untuned states and the periodic reduction of photon transmission through the instrument to give rise to a periodic decrease and then increase in the radiation transmitted.

The invention accordingly comprises the several steps and the relation of one or more of such steps with respect to each of the others, and the apparatus embodying features of construction, combination of elements and arrangements of parts which are adapted to effect such steps, all as exemplified in the following detailed disclosure, and the scope of the invention will be indicated in the claims.

For a fuller understanding of the nature and objects of the invention, reference should be had to the following detailed description taken in connection with the accompanying drawings in which FIG. 1 is a potential diagram illustrating the effect of applying a dc potential difference across an electron channel in a silicon-silicon dioxide assembly;

Figure 1:
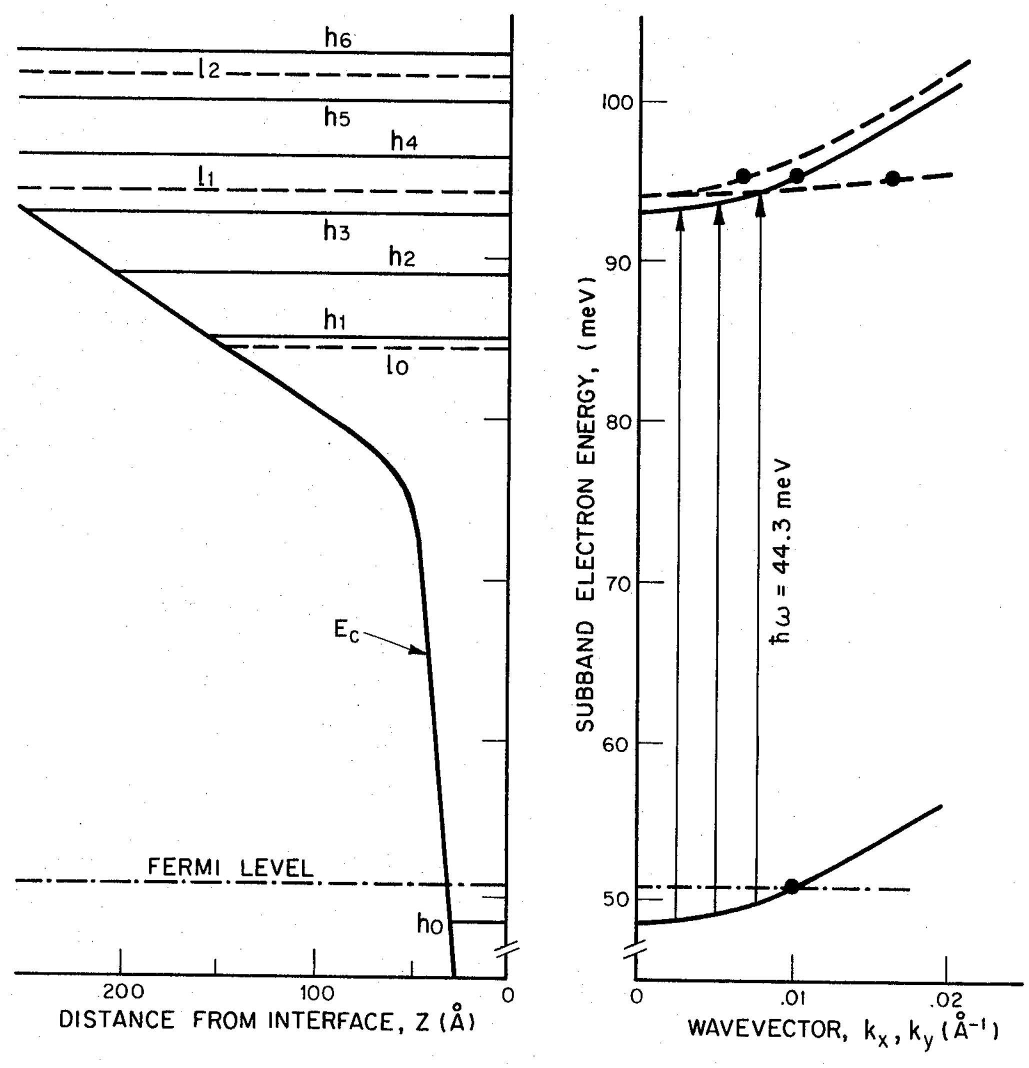

The instruments of this invention are based upon the observation that in narrow inversion channels on (001) silicon surfaces bounded by a silicon dioxide layer where there exist quantized levels in electron motion normal to the surface, the energy level spacing is a strong function of the potential defining the channel. Absorption of photons entering the channel may be modulated by a voltage applied between a field plate (gate) and the inverted conduction channel. This observation made with regard to channels on the (001) silicon surface is equally valid for and applicable to any crystallographic surface of silicon. Therefore, the present invention is not to be construed as being limited to channels on (001) silicon surfaces.

In the following detailed discussion of the operational theory and of the construction of the devices of this invention, the embodiment in which the silicon is p-type and the channel is an inverted n-type will be used as exemplary. Other embodiments will be illustrated and are meant to be included within the scope of this invention.

An n-type inverted channel is produced at the (001) surface of p-type silicon when the energy bands are bent by the action of a gate voltage such that the bottom of the conduction band is near the Fermi level. For this case, neglecting immobile surface charges, the potential for mobile electrons near the surface will be triangular with a field normal to the surface given by $F = (2 E_g N_A/\epsilon)^{1/2}$ just at that gate voltage $V_T$ when mobile charges begin to occupy the channel. In MKS units, $E_g$ is the band gap, $N_A$ the bulk acceptor concentration and $\epsilon$ the dielectric constant of silicon. Assuming the effective mass-approximation for this well, the energy levels are given by $$E = E_{ci} + \hbar^2/2m_x K_x^2 + \hbar^2/2m_y K_y^2 \qquad (1)$$

where $E_{ci}$ is the solution of the Schrödinger equation with a linear potential $eFz$ for $z > 0$.

$$E_{ci} = -(e\hbar F)^{2/3}/(2m_z)^{1/3} S_i \qquad (2)$$

Here $S_i$ is the $i^{th}$ solution of $Ai(s)=0$, $Ai(s)$ is the Airy function. Due to the nature of the band structure of silicon, described by six mass ellipsoids oriented along <001> and equivalent directions, $m_z$ will have two values 0.98 $m_e$ and 0.19 $m_e$ for a (001) surface. This gives rise to two energy level ladders neglecting valley degeneracy splitting. Associated with each mass ladder there will be distinct and different two-dimensional bands describing the motion parallel to the surface where $k_x$ and $k_y$ are measured relative to the conduction band minima. For the heavy mass ladder an isotropic conduction mass exists with $m = 0.19\ m_e$, and for the light mass ladder $m_x = 0.19\ m_e$, $m_y = 0.98\ m_e$ are derived from the <100> ellipsoids. Electric dipole transitions can be induced between these electric subbands with the photon electric field vector perpendicular to the interface. If only the ground state is occupied, two types of transitions may occur, those to subbands having a curvature identical to the ground state, ideally characterized by a sharp line absorption, and those to subbands having a different curvature, hence a broad and weaker absorption.

Inversion necessitates a self-consistent solution of Poisson's and Schrodinger's equation to determine the spatial extent of the mobile charge distribution hence the potential and energy levels. Previous calculations (Phys. Rev. 163, 816 (1967)) for $N_A$=$10^{15}$/$cm^3$ and for mobile charge density $n_s \leq 5 \times 10^{12}$ electrons/$cm^2$ show that the potential is significantly modified only for the ground state. The triangular well is therefore nearly unaffected for the excited states with the gate voltage depressing only the ground state. Thus the separation between excited states is set by the bulk doping level and the ground state is tuned with increasing inversion.

Figure 2:
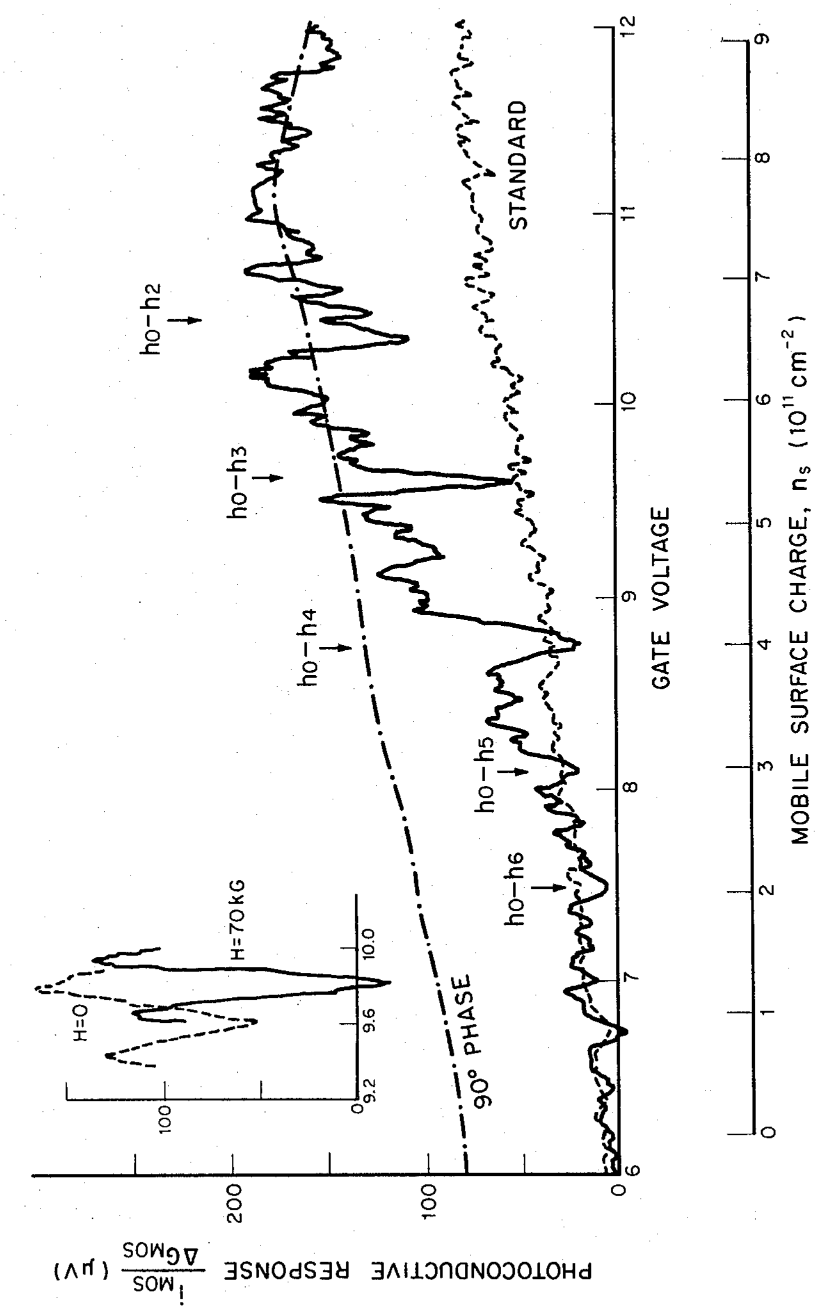
FIG. 2 is a plot of the photoionization response as a function of both voltage and mobile surface electron density exhibited by one modification of the device of this invention in which the silicon is p-type and the channel is inverted n-type.
Figure 3:
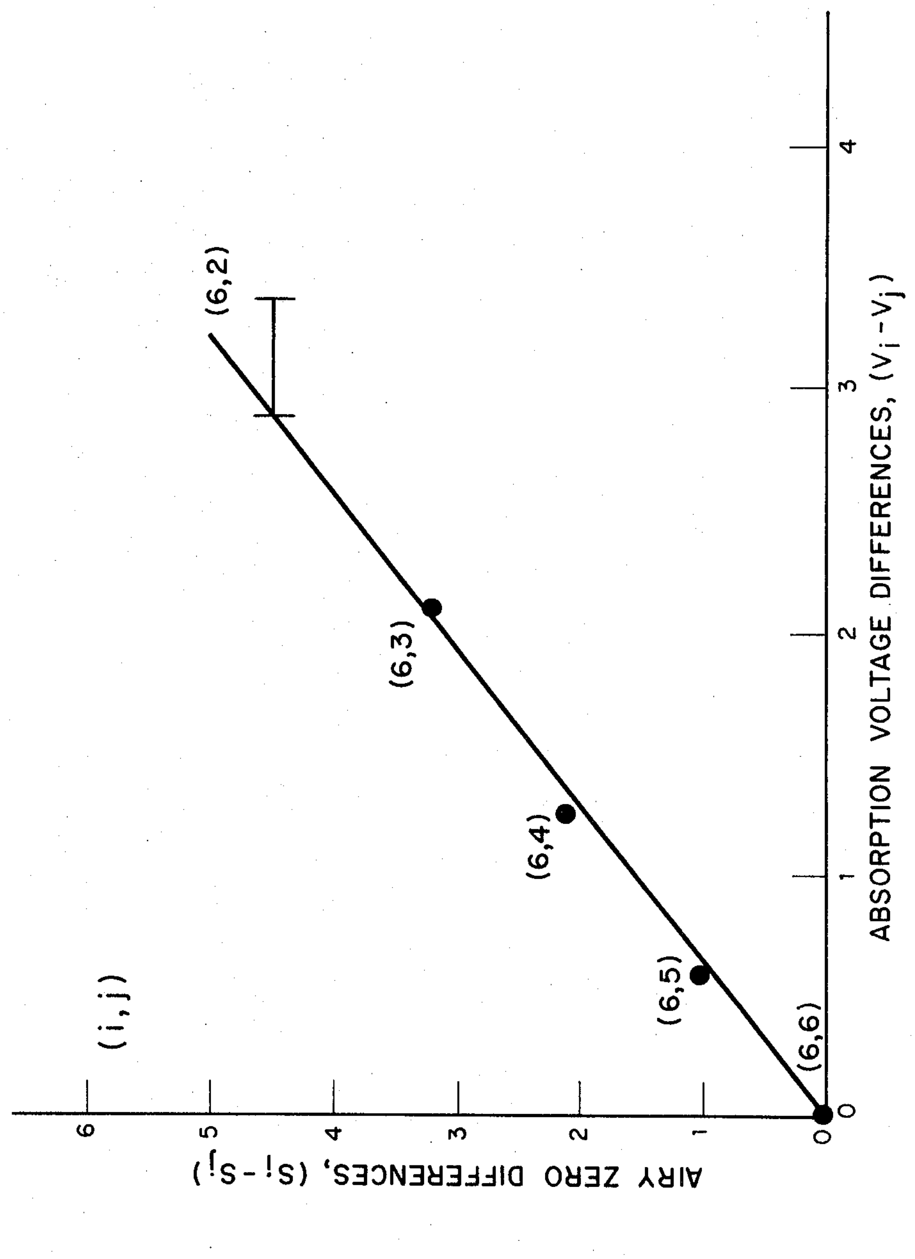
FIG. 3 is a plot of the differences of the Airy function zeros against the measured voltage differences associated with the resistance peaks using the sixth level as reference for the same device modification as used to obtain FIG. 2.
Figure 4:
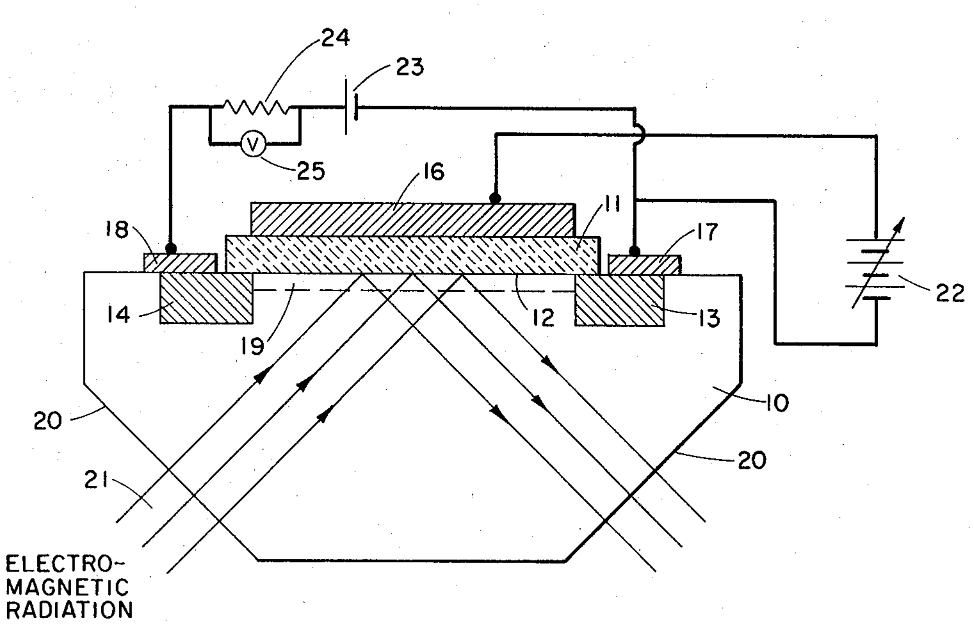
FIG. 4 is a cross section through an embodiment of an electromagnetic radiation detector constructed according to this invention in which the silicon is p-type and the channel is an electron inversion layer.
Figure 5:
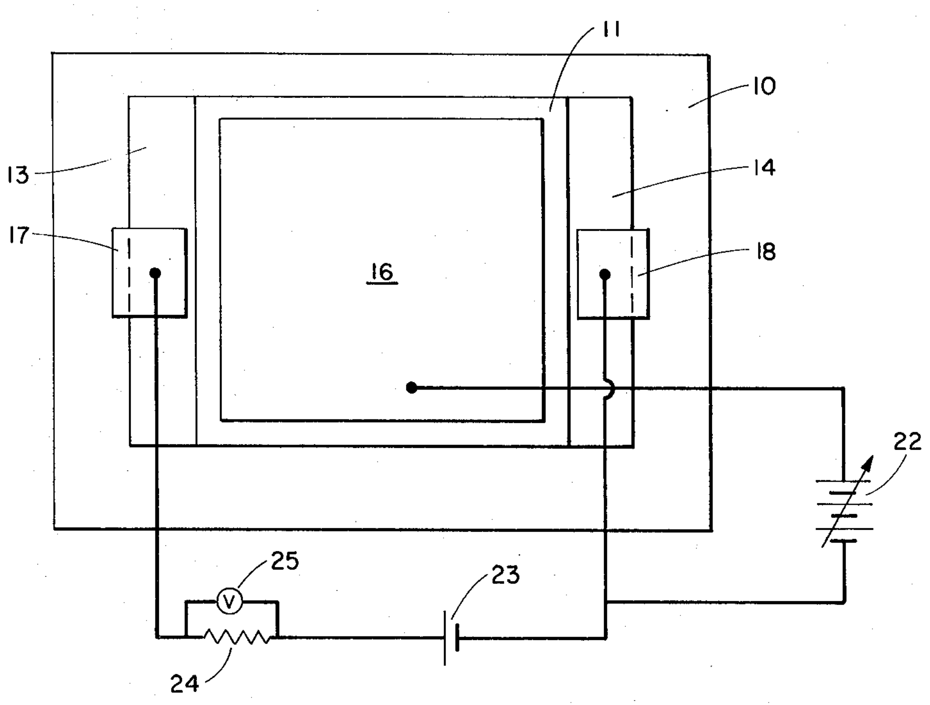
FIG. 5 is a top plan view of the detector of FIG. 4.

A potential diagram for such a situation is shown in FIG. 1 and it is for a device constructed in the manner shown in FIGS. 4 and 5 which may be described prior to further examination of FIGS. 1–3. In fabricating the instrument of FIGS. 4 and 5, an MOS p-type silicon device is made using the techniques described in "Physics and Technology of Semiconductor Devices" by A. S. Grove, John Wiley & Sons, Inc., New York, N.Y., 1967. The basic structure comprises a p-type silicon substrate or base 10, a silicon dioxide layer 11 defining a smooth interface 12 with the silicon base, a precisely defined volume 13 of highly-doped n-type silicon commonly called a source and a precisely define volume 14 of highly-doped n-type silicon commonly called a drain. A field plate 16, in the form of a vacuum-deposited aluminum electrode on the silicon dioxide, and vacuum-deposited aluminum electrode 17 and 18 on the electron source and drain volumes 13 and 14, respectively, complete the MOS assembly. The inverted n-type channel 19 is defined between the electron source volume 13 and drain volume 14 and its depth, which is of the order of about 50 A, is variable according to the gate voltage across it. The silicon base 10 is cut to have beveled edges 20 for introducing radiation 21 into channel 19.

Any suitable dc source such as battery 22 may be used to establish and maintain the variable gate voltage across channel 19. Likewise any known means may be used to monitor the resistance along channel 19, that in FIGS. 4 and 5 being shown to comprise a dc source, e.g., battery 23, resistor 24 and voltmeter 25.

It will, of course, be appreciated by those skilled in the art that there are a number of different well-known means for supplying the necessary current and for measuring the resistance along the channel, those being shown in FIGS. 4 and 5 as simple exemplary embodiments of such means. For example, the channel resistance measuring means may be based upon any of the well-known so-called bridge techniques and may be an ac or dc system.

Although the field plates, silicon dioxide layer and electrodes are shown as retangular in shape, it will be appreciated by those skilled in the art that they may assume any suitable configuration. A test instrument was fabricated having an elliptical field plate 1 × 2.5 mm with a 1,500 A $SiO_2$ dielectric forming the gate structure. Starting with 40 Ωcm. p-type material, device interfacial states were determined to be about 8 × $10^{11}$/$cm^2$ by the temperature dependence of the threshold voltage necessary for inversion. The equivalent circuit of the structure at 4.2°K is the dielectric capacitance of 500 pE. in series with the channel resistance when strongly inverted, of about 10KΩ. Beveling 20 of the narrow edges on the back side of silicon base 10 was at a 45° angle so that the radiation from a $H_2O$ molecular laser could pass into channel 19 parallel to the interface 12. Conductance measurement were taken by observing voltmeter 25 as the gate voltage, i.e., voltage from voltage source 22 was varied.

In FIG. 1 the quantizing potential with associated normal motion binding energies is indicated for a composite triangular well model such as that which is developed in the apparatus of FIGS. 4 and 5 when a potential difference is impressed across channel 19. The known acceptor density $N_A = 2 \times 10^{14}$/cc determines the depletion field of 8.4 × $10^3$ V/cm. A surface field of 1.5 × $10^5$ V/cm is shown for an electron sheet of $10^{12}$/$cm^2$ which consists of both mobile subband charge and immobile interface charge. The fitting of the two triangles into a model well is done schematically to force the $h_0 - h_3$ energy splitting to be 44.3 meV which is the photon energy of the incident $H_2O$-laser radiation. Associated dispersion curves for the $h_0$, $h_3$ and $l_1$ parallel motion subbands are also indicated, the nonresonant subbands being omitted for clarity. Dots on the dispersion plot indicate the first Landau state for the subbands with an imposed magnetic field $B_z = 70$ kG.

Channel conductance can be represented as $G = n_1 e\mu_1 + n_2 e\mu_2$ where $n_1$ is the number of electrons in the ground subband, $n_2$ the number in the excited subband and $\mu_{1,2}$ the carrier mobilities in the respective bands. Here $$n_1 + n_2 = n_s = \epsilon_{ox} (V_g - V_T)/ed \qquad (3)$$

a constraint imposed by the gate voltage $V_g$ relative to the threshold voltage $V_T$ where $\epsilon_{ox}$ is the oxide dielectric constant and $d$ the oxide thickness. Clearly $n_2 = n \alpha\tau$, where $n$ is the resonant photon flux, $\alpha$ the absorption which is a functional of $n_s$, and $\tau$ the excited state lifetime. Thus channel conductivity modulation, assuming $\mu_1 \neq \mu_2$, occurs when the gate voltage resonates the subband level differences with the photon energy 44.3 meV associated with the $H_2O$-laser.

At the Si – $SiO_2$ interfaces the distribution of interface states in the forbidden gap near the conduction and valence bands have been shown to imply a broad distribution of negatively charged states (acceptors) peaked about 100 meV below the band. With weak inversion these acceptors are photoionized to the lowest subband. As inversion is increased, the Fermi level moves to higher energy relative to the interfacial distribution. Thus this photoresponse turns on below the threshold for dark channel conductance, attains a maximum at an intermediate value of channel current and then decreases to zero when the Fermi level is more than 44.3 meV above the tail of the distribution. The recombination rate may be characterized as "slow", since the magnitude of the photoconductivity out-of-phase with the chopped laser beam is nearly the same as the in-phase component. This process of conductivity increase will compete with a conductivity change due to absorption between electric subbands.

The photoionization response of the instrument of FIGS. 4 and 5 is plotted as a function of both gate voltage and mobile surface electron density (i.e., charge induced above the inversion threshold at 6.2 volts). The ordinate, scaled in microvolts, is better defined by the standard response which denotes the in-phase signal obtained when a photocell of ΔG = 0.1 mho rms fluctation was placed electronically in series with the (dark) MOS device. The rising standard response is due to the sensing current $i_{MOS}$ increasing with inversion; the standard is removed from the circuit prior to radiation of the MOS device. The reactive component of the interfacial photoconductivity is labelled 90° phase. This component has none of the structure seen on the in-phase response. The dipole transitions from ground heavy subband $h_0$ to excited heavy subbands $h_2$ through $h_6$ are identified by means of the magnetic field accentuation of the $h_0 \rightarrow h_3$ transition photoconductance via the condensation of states near the degeneracy of the $h_3$ and $l_1$ subbands. The incident power was about 50$\mu$ watts.

FIG. 2 shows both the in-phase and out-of-phase photoconductivity response as a function of gate voltage. The in-phase component has imposed on the photoionization background sharp lines corresponding to conductivity decreases apparently attributable to absorption between electric subbands. The identification of the particular subbands involved in the transitions is facilitated by interpretation of the magnetic field effects. All lines are shifted to higher gate voltage by about 0.2 volt in a 70 kilogauss field. As shown in the inset of FIG. 2 associated only with the $h_0 \rightarrow h_3$ is there a strong magneto-resistive increase. For a triangular well defined by any depletion field F, a near degeneracy will occur for the $h_3 - l_1$ and the $h_1 - l_0$ levels due to the masses involved in the two level ladders. In the parallel dispersion only the $h_3 - l_1$ levels cross at small values of $k$ because of the differing curvatures of the $h$ and $l$ bands. It may be postulated that the decrease in conductivity must reflect decreased mobility in excited states. Those conduction states where band mixing occurs will show further mobility decreases due to the increased conduction mass component $m = 0.98\ m_e$ associated with the $l$ states. Application of the magnetic field forces Landau condensation in the density of states such that in the field all transitions will occur from a single Landau ground state to the first $h_3$ Landau state which must accentuate the strong band mixing. Thus the magneto-resistance is due to an increased density of states associated with the lower mobility of the mixed $h_3 - l_1$ state, assuming mobility is inversely proportional to mass.

These interpretations identify the line attributed to the transition $h_0 \rightarrow h_3$ ($h_3 - l_1$ mixed state). Since the relative positions of the other excited states is given by (2), the labelling may be further tested $$E_{ci} - E_{c0} = (e\hbar F)^{2/3}/(2m_z)^{1/3}\ S_i - f(V_t) = h\nu \quad (4)$$

where $f(V_t)$ is some function of the inverting charge characterizing the position of the ground state. Subtracting for a transition to the $j^{th}$ state there results $$(e\hbar F)^{2/3}/(2m_z)^{1/3} \cdot (S_i - S_j) = f(V_i) \cdot f(V_j) \quad (5)$$

FIG. 3 is a plot of the Airy function zeros against gate voltage differences referenced to the sixth state. With a value of $N_A = 2 \times 10^{14}/cm^2$, a value of depletion field $F = 8.35 \times 10^3$ V/cm is derived. The data of FIG. 3 may be interpreted to show that the ground state is depressed nearly linearly with voltage at a rate of 4.5 meV/volt or 3.0 meV/$10^{11}$ e/cm$^2$. Hence typical line widths are 1 - 2 meV. The rate at which the ground state is depressed may be independently determined by analyzing the voltage shift of the $h_0 \rightarrow h_3$ transition in the magnetic field ($\delta V_T$ can most accurately be determined here since this is the narrowest line). The threshold shift in a magnetic field is due to the zero point Landau energy $e$B/2m. Taking into account the spin splitting, the ground state energy becomes $E_{ho} + e$B/2m $- g\beta B$. Including valley degeneracy, the state density will be about $1.7 \times 10^{11}$ electrons/cm$^2$ for an energy shift of 2.2 meV in 70 kilogauss. Hence the ground state is depressed 2.2 meV by a gate voltage of 0.2 volts, giving a rate near threshold of 11 meV/volt. This confirms to within a factor of 2 the rate at which the ground state is depressed.

The existence of voltage tunable optical transitions between electric subbands at the (001) surfaces of silicon as evidenced by a conductance decrease in the inverted n-type channel which is attributed to occupation of the excited subbands makes possible a large voltage tunability of electron energy levels in the system and thus provides the basis for a voltage-tunable infrared detector or intensity modulator.

Figure 6:
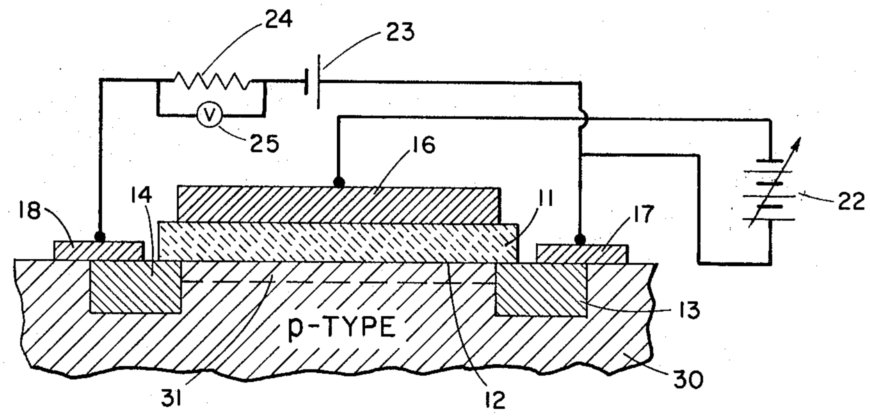
FIG. 6 is a cross section through a second device embodiment in which the silicon is p-type and the channel is a hole accumulation layer.

Assuming that it is possible to attain an absorption $\alpha$ coefficient of about $10^{-4}$, and using a measured incident power of about $50 \times 10^{-6}$ watts of $\lambda = 28\mu$ radiation and an observed signal to noise ratio for the $h_0 - h_3$ transition of about 20 for a 1Hz band pass, the Noise Equivalent Power (NEP) for the device of FIGS. 4–6 should be $$NEP = 50 \times 10^{-6} \times 10^{-4} \times 1/20 \cong 2.5 \times 10^{-10}\ \text{watts/(sec)}^{1/2}.$$

Figure 7:
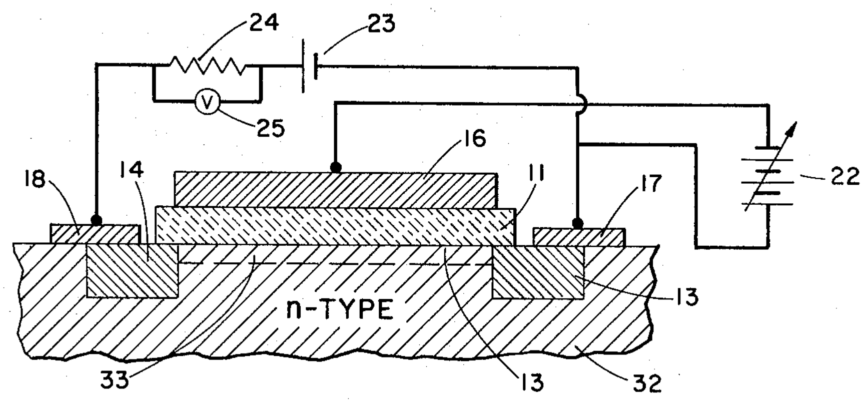
FIG. 7 is a cross section through a third device embodiment in which the silicon is n-type and the channel is a hole inversion layer.
Figure 8:
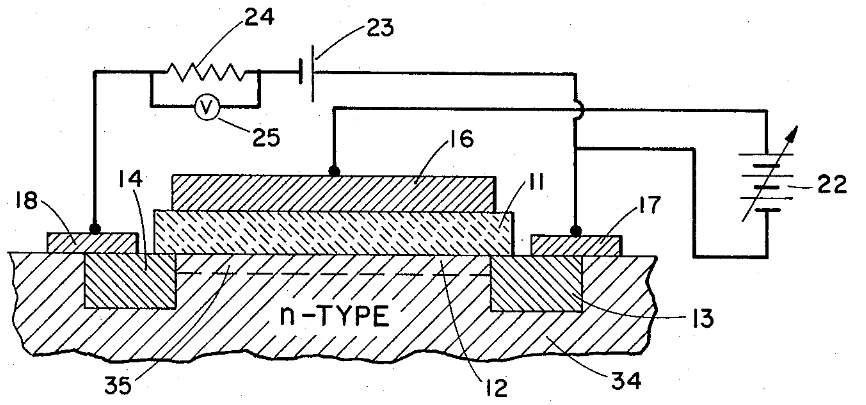
FIG. 8 is a cross section through a fourth device embodiment in which the silicon is n-type and the channel is an electron accumulation layer.

FIGS. 6–8 show three additional embodiments of the device of this invention and the manner in which they are electrically connected to the means for impressing a variable gate voltage across the channel and suitable means for monitoring the channel resistance. In FIGS. 6–8, like reference numerals are used to identify identical components referenced in FIGS. 4 and 5.

In FIG. 6, the base 30 is p-type silicon and channel 31 in p-type, i.e., a hole accumulation layer. The device of FIG. 7 has an n-type silicon base 32 and a p-type channel 33 (hole inversion layer). Finally, the embodiment of FIG. 8 has an n-type silicon base 34 and an electron accumulation layer.

Figure 9:
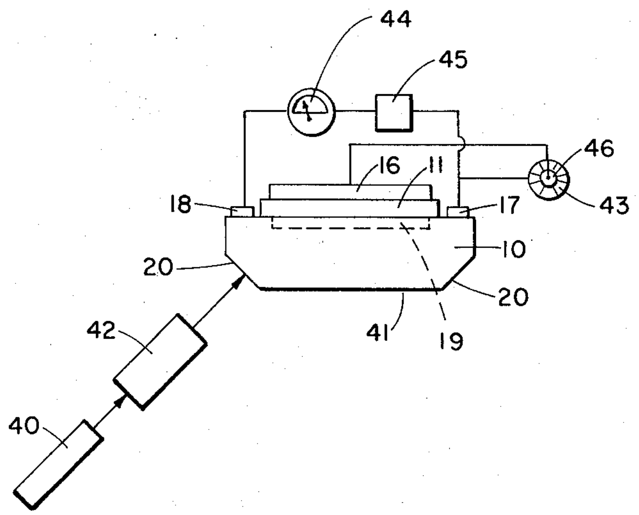
FIG. 9 illustrates the use of the device of this invention as a tunable electromagnetic radiation detector.

It is now possible to describe the operation of the voltage-tunable infrared detector of this invention using the device of FIGS. 4 and 5 and the instrument assembly of FIG. 9 as exemplary. No attempt is, of course, made to draw the components of FIG. 9 to scale, the drawing being of a schematic nature. Radiation to be detected is provided from a suitable source 40, such as an $H_2O$-laser, and is then directed, preferably at 90°, onto the bevelled edge 20 of the device 41 constructed for example as shown in FIGS. 4 and 5. The bevelled edges 20 may have an antireflection coating as is well known in the art. In addition to the use of the bevelled edge as a radiation directing means 42, such means may comprise simple prism and/or lens systems, a dispersing grating, a fiber optics system, an optical waveguide such as described by J. E. Midwinter in *IEEE Journal of Quantum Electronics*, Vol. QE-7, No. 7, July 1971 pages 339–350, or a dielectric waveguide such as disclosed by D. B. Anderson, J. T. Boyd and J. D. McMullen in "Submillimeter Waves" Polytechnic Press, New York, N.Y., 1971, pages 191–210.

Since the instrument of FIG. 9 is voltage tunable, the means 43 by which the gate voltage across the channel is varied (e.g., the variable dc power source 22 of FIGS. 4 and 5) may be calibrated directly in wavelengths. Such calibration may be originally accomplished by using radiations of known wavelengths and noting at what voltage the resistance is maximized as observed from any suitable resistance measuring means as meter 44. The small current through the channel is supplied by a suitable power source 45.

Once the detector is calibrated it is a simple matter to tune it to any desired wavelength by adjusting the gate voltage and to determine the number of photons incident on the channel by noting the channel resistance as measured by any suitable means as meter 44. It is also, of course, possible quickly to scan a beam of radiation by turning knob 46 on the variable voltage supply means 43 through a predetermined arc while noting the magnitude of the channel resistance which, as pointed out above, is a function of wavelength. Any samples to be examined may be placed directly between the radiation source 40 and the detector, or the radiation to be examined, e.g., from an agricultural crop, may be directed into the detector by any suitably designed optical path means.

In the use of this detector the noise due to photoexcitation associated with the background sea of photons will be less than other detectors. This comes about since the device absorbs, hence photoexcites, only selected wavelengths in the background corresponding to the energy levels differences. Analogously, this corresponds to a cooled narrow band filter prefacing a wide band photodetector.

Tunability of the device to a particular wavelength not only improves noise considerations but permits the device to be a spectrometer as well. The range of a properly designed device may be from about 5$\mu$ to about 50$\mu$. In principle the 5$\mu$ limit will be set by the dielectric breakdown of the $SiO_2$ layer and the 50$\mu$ limit by practical limitations on the minimum number of surface states attainable in device fabrication.

Amplitude modulation of a beam of electromagnetic radiation can be accomplished by this device through photon absorption. Since the device may be electrically tuned on and off resonance, photons may be extracted from the beam at response rates determined by the rate at which the on-off voltage condition is achievable.

Figure 10:
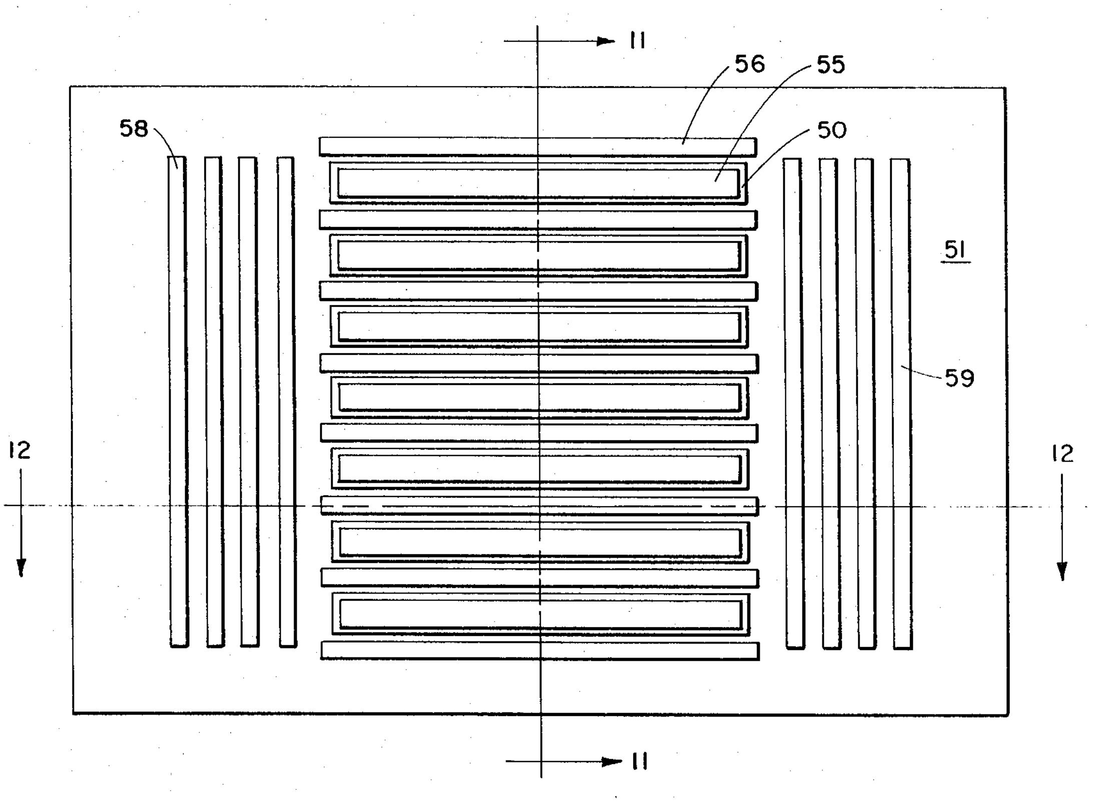
FIG. 10 is a top plan view of a radiation amplitude modulator constructed in accordance with this invention.
Figure 11:
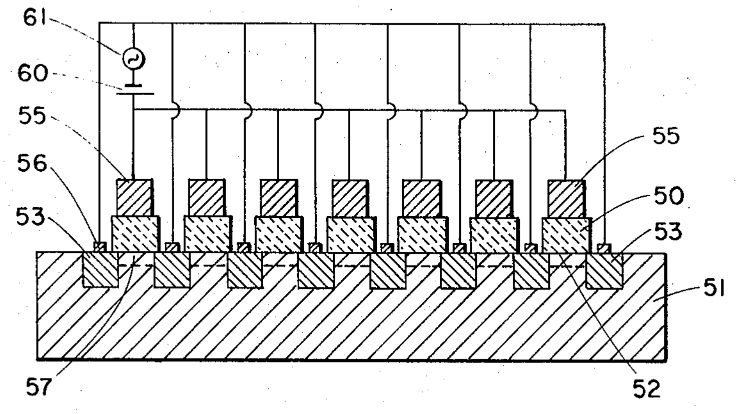
FIG. 11 is a cross section of the modulator of FIG. 10 taken through plane 11—11 of that figure.
Figure 12:
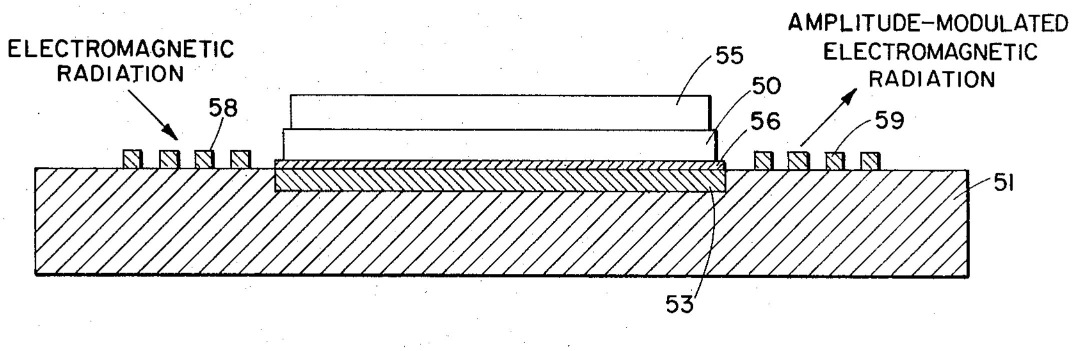
FIG. 12 is a cross section of the modulator of FIG. 10 taken through plane 12—12 of that figure.

FIGS. 10–12 illustrate in top plan and cross sectional views an amplitude modulator constructed in accordance with this invention. A plurality of silicon dioxide strips 50 are deposited or grown on a silicon base 51. Each silicon dioxide strip forms an interface 52 with the silicon base (FIG. 11). Within the silicon base between each of strips 50 and extending along the long edges of the two end strips, are precisely defined volumes 53 of highly-doped n-type silicon. A field plate 55 is associated with each silicon dioxide strip and a contact 56 is associated with each n-type region 53. Electron channels 57 are defined between the highly-doped n-type regions and are bounded by the interfaces 52. As seen in FIGS. 10 and 12, gratings 58 and 59 may be located at the radiation entrance and exit sides of the modulator. The field plates 55 are connected in parallel to a source of dc power 60 and a source of ac power 61 thereby to provide a dc gate voltage and an auxiliary ac gate voltage, respectively.

The electrical characteristics of the device of FIGS. 10–12 may be represented as gate capacitors in series with the channel resistances. With a dc bias from dc source 60 set to resonance, ac voltages from source 69 ($\Delta V$) of about an 0.2-volt swing will tune away from absorption, hence modulation rates and powers can be estimated. A figure of merit may be derived in the following way for the device of FIGS. 10–12.

The absorption due to the electronic transition in a length of $2\lambda_o/n$ at a resonant voltage $V_o$ may be designated $\alpha$. Here $\lambda_o$ is the free space wavelength and $n$ the index of refraction of silicon. Assume a modulation index $m$ and a linear expansion of the absorption equation $I = I_o e^{-\ \ x}$. Then for small modulation indices $\alpha x = m$ where $x$ is expressed in the number of $2\lambda_o/n$ *length's.*

The capacitance of such a device is $C = \epsilon dl/a$ where $\epsilon$ is the dielectric constant of $SiO_2$. The resistance of the device is expressed in surface channel resistivity K ohms/square. Thus $$R = K\ d/l.$$

The response time, change from resonance to 90 percent of required modulation index m is then $$\tau = 2.2\ RC = 2.2\ [Kd/l]\ [\epsilon\ dl/a] = 2.2\ K\ \epsilon/a\ d^2$$

The modulation power will be to within a factor of two $$P = C(\Delta V)^2\,\Delta f = \epsilon dl/a\ (\Delta V)^2\,\Delta f.$$

It is possible to use these criteria to compare with other forms of laser modulation. Henderson and Arams (see Optics Comm. 2:223 (1970)) have considered relative figures of merit for acoustooptical and electrooptical materials for operation at 10.6$\mu$. Their power and frequency modulation limits for both of these cases are tabulated below along with comparable figures for the device of this invention.

Modulation Limits at 10.6$\mu$

| Type of Modulator | Power Limit (Watts) | Frequency Limit (Bandpass) |
|---|---|---|
| Acoustrooptic (Ge) | ~$40 \times 10^{-8}\ \Delta f\ m$ | ~500 MHz |
| Electrooptic (GaAs) | ~$10 \times 10^{-5}\ \Delta f\ m$ | ~10,000 MHz |
| FIGS. 10–12 instrument | ~$40 \times 10^{-11}\ \Delta f\ m$ | ~10,000 MHz |

The fundamental reason for the much higher efficiency for the modulator of this invention over the others can be explained by pointing out that the electro-optical and acousto-optical processes are those involving electronic transitions via virtual states, hence the probability involves the product of four matrix elements. In contrast, in the modulator of this invention absorption is the square of a matrix element. However, since the device of this invention essentially converts radiation to heat during amplitude modulation, large amounts of radiation can only be modulated if the heat generated is adequately dissipated.

Figure 13:
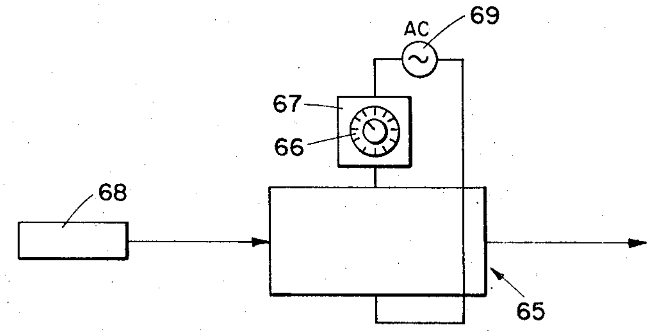
FIG. 13 illustrates the use of the device of this invention as an amplitude modulator.

The operation of a modulator, such as that shown in FIGS. 10–12, is illustrated schematically in FIG. 13. The modulator, generally indicated at 65 may be calibrated to read directly in wavelengths by exposing it to radiation at a series of wavelengths over the range through which the modulator is to function, and transferring this information to a scale 66 associated with the dc power source 67 (gate voltage) in essentially the same manner as described for the detector of FIG. 9. Once the instrument is calibrated, it is only necessary to set it to effect interaction between the quantized electrons and the photons in the radiation of the wavelength supplied by source 68 and then to apply additional ac power from power source 69 in the form of an auxiliary gate voltage at a level so that the total potential difference across the electron channel is cycled between a value above and below that at which such interaction occurs.

It will thus be seen that there is provided a new quantum mechanical method and apparatus for detecting or modulating electromagnetic radiation in the wavelength range of from about 5 to about 50$\mu$. The instrument is voltage tunable, has good signal-to-noise capability, narrow wavelength sensitivity, reasonable source impedance and may be operable at higher temperatures than the present photoelectric semiconductor devices.

It will thus be seen that the objects set forth above, among those made apparent from the preceding description, are efficiently attained and, since certain changes may be made in carrying out the above method and in the constructions set forth without departing from the scope of the invention, it is intended that all matter contained in the above description or shown in the accompanying drawings shall be interpreted as illustrative and not in a limiting sense.

We claim:

1. A quantum mechanical voltage-tunable electromagnetic radiation detector, comprising in combination a. a semiconducting silicon base member having at least one bevelled edge thereby to provide a surface normal to the direction at which radiation is introduced into said detector;

b. a silicon dioxide layer on the surface of said base forming an interface therewith;

c. charge carrier source and charge carrier drain means forming a channel at said interface;

d. variable voltage applying means for impressing a gate voltage across said channel;

e. radiation directing means, including said bevelled edge of said base member, adapted to introduce electromagnetic radiation into said channel in a manner to obtain a radiation component of electric field vector perpendicular to said channel;

f. means to impress a potential difference along said channel; and g. means to measure the electrical resistance along said channel as a function of said gate voltage.

2. A voltage-tunable detector in accordance with claim 1 wherein said silicon base is p-type and said channel is characterized as being an electron inversion layer.

3. A voltage tunable detector in accordance with claim 1 wherein said silicon base is p-type and said channel is characterized as being a hole accumulation layer.

4. A voltage tunable detector in accordance with claim 1 wherein said silicon base is n-type and said channel is characterized as being a hole inversion layer.

5. A voltage-tunable detector in accordance with claim 1 wherein said silicon base is n-type and said channel is characterized as being an electron accumulation layer.

6. A voltage-tunable detector in accordance with claim 1 further characterized as being sensitive to electromagnetic radiation in the wavelength range of about 5 to about 50$\mu$.

* * * * *